United States Patent
Das et al.

(10) Patent No.: US 12,482,284 B1
(45) Date of Patent: *Nov. 25, 2025

(54) SYSTEMS AND METHODS FOR ANALYZING IMAGES TO DETERMINE TEXTUAL EXTRACTIONS USING BIFURCATED IMAGE RECONSTRUCTIONS

(71) Applicant: The Bank of New York Mellon, New York, NY (US)

(72) Inventors: Mukunda Kurukundi Das, Pittsburgh, PA (US); Aditya Paul, Pittsburgh, PA (US); Gaurav Gupta, Lake Mary, FL (US)

(73) Assignee: The Bank of New York Mellon, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/076,950

(22) Filed: Mar. 11, 2025

Related U.S. Application Data

(63) Continuation of application No. 19/066,109, filed on Feb. 27, 2025.

(51) Int. Cl.
*G06V 30/10* (2022.01)
*G06Q 20/04* (2012.01)
*G06V 20/62* (2022.01)

(52) U.S. Cl.
CPC ............ *G06V 30/10* (2022.01); *G06Q 20/042* (2013.01); *G06V 20/62* (2022.01)

(58) Field of Classification Search
CPC ................. G06V 30/00–43; G06V 20/62–635
See application file for complete search history.

(56) References Cited

U.S. PATENT DOCUMENTS

| | | |
|---|---|---|
| 11,539,848 B2 | 12/2022 | Roach et al. |
| 2006/0219773 A1 | 10/2006 | Richardson |
| 2019/0266431 A1 | 8/2019 | Tallman |
| 2020/0019769 A1* | 1/2020 | Leibovitz .............. G06F 18/214 |
| 2023/0206522 A1* | 6/2023 | Tang ................ G06V 30/18057 345/467 |

* cited by examiner

*Primary Examiner* — Sean T Motsinger
(74) *Attorney, Agent, or Firm* — Foley & Lardner LLP

(57) ABSTRACT

Systems and methods for information extraction. As one example, systems and methods are described herein for image analysis and processing. The systems and methods achieve the improvements to information extraction through the use of Large Language Models (LLMs) through prompt construction that includes a plurality of reconstructed forms and instructions for processing each.

20 Claims, 8 Drawing Sheets

Michelle Cents [0.3451, 0.4459], [2.9243, 0.4521], [2.9243, 0.7347], [0.3451, 0.7284]
123 Penny Drive [0.3514, 0.0054], [3.0624, 0.8917], [3.0624, 1.1931], [0.3514, 1.1806]
: : :

// Use his section to understand the nature of the OCR data being provided to you as input Section B: OCR Data Information
- There are two kinds of OCR data that will be given to you. Both of these apply to the same output that has gone through the OCR pipeline. The only difference is how the output from the OCR engine was formatted.

1. Coordinate Form Data Extraction

With each line, we included the bounding box coordinates organized in the following manner:

EXAMPLE LINE 1 [x1, y1], [x2, y2], [x3, y3], [x4,y4]
    [x1,y1] refers to the bottom left coordinate
    [x2, y2] refers to the bottom right coordinate
    [x3, y3] refers to the top right coordinate
    [x4, y4] refers to the top left coordinate These coordinates are therefore arranged in the anticlockwise direction starting from bottom left 2. ASCII Art Form Data Extraction The following steps are used to construct this representation Coordinates data for bounding boxes across different lines found in the input file are aggregated into a 3D matrix of shape (Text Line, Bounding Boxes, x-y coordinates).

....

Once aggregated, apply min-max scaling to scale all values in the matrix between 0 to 1. We use a min values of 0 and the max value is set to the desired canvas size. This step is necessary to ensure that We use the following formula $$X_{scaled} = \frac{X - X_{min}}{X_{max} - X_{min}}$$

We scaled Y coordinates and recreate our scaled 3D matrix to prepare for plotting.

SYSTEMS AND METHODS FOR ANALYZING IMAGES TO DETERMINE TEXTUAL EXTRACTIONS USING BIFURCATED IMAGE RECONSTRUCTIONS

CROSS-REFERENCE TO RELATED APPLICATION(S)

This application is a continuation of U.S. patent application Ser. No. 19/066,109, filed Feb. 27, 2025. The content of the foregoing application is incorporated herein in its entirety by reference.

BACKGROUND

Information extraction, whether in text, audio, or image formats, is a process of analyzing content to identify, interpret, and retrieve meaningful data embedded within the content. For example, with respect to images, this involves using advanced techniques such as computer vision, object/object character recognition, and machine learning algorithms to process the visual elements of an image and convert them from an unstructured to a structured form. The existence of this unstructured (or semi-structured) form creates a persistent extraction challenge as the lack of a consistent organization and predefined schema can prevent straightforward data interpretation. For example, unlike structured data, where information is arranged in predictable rows and columns or follows a standard format, unstructured forms like free-text documents, emails, and images are inherently variable, with no uniform structure to guide extraction. Semi-structured forms, such as XML files or invoices, provide partial organization but still allow for variations in layout, labeling, and content placement, making automated processing difficult. The variability in these formats demands advanced techniques to interpret content and context accurately. For instance, in a handwritten form, the same type of information—such as a date or address—might appear in different locations or formats, requiring the extraction system to identify patterns and relationships dynamically. Additionally, contextual dependencies, such as recognizing that "05/10" refers to a date in one instance and a product code in another, complicate the task, while noise, such as irrelevant text, ambiguous formatting, and incomplete or inconsistent data, adds further layers of complexity.

SUMMARY

Systems and methods are described herein for novel uses and/or improvements to information extraction. As one example, systems and methods are described herein for image analysis and processing. In particular, the systems and methods achieve the improvements to information extraction through the use of Large Language Models (LLMs) through novel prompt construction that includes a plurality of reconstructed forms and instructions for processing each.

Conventionally, LLMs are ineffective in reasoning with numbers and detecting complex patterns involving numbers because they are primarily designed to process and generate natural language based on patterns in text, not numerical data. For example, LLM training focuses on statistical relationships between words, phrases, and context, which means they excel at linguistic tasks but lack innate mechanisms for precise arithmetic, mathematical reasoning, or pattern recognition involving numbers. Numerical reasoning requires logical consistency, rule-based computation, and an understanding of quantitative relationships, which LLMs struggle with because they rely on probabilistic approximations rather than explicit rules or algorithms. Moreover, the tokenization process used by LLMs treats numbers as sequences of characters, which can obscure their quantitative significance.

However, LLMs are efficient at stitching together different pieces of information as well as constructing outputs based on predetermined requirements. Accordingly, if the fundamental technical problem of allowing LLMs to process numbers and detecting complex patterns involving numbers is overcome, LLMs could be used for information extraction involving disparate pieces of information and/or constructing outputs based on predetermined requirements.

To overcome these technical deficiencies in LLMs for information extraction, the systems and methods disclosed herein provide a generalizable solution for reformatting data from information extraction systems (e.g., object character recognition systems) into positionally aware textual forms that allow LLMs to determine the spatial location of information in the data that is significant to the final structured output. The systems and methods achieve this by generating multiple reconstructed forms that are inputted to the LLM.

For example, the two reconstructed forms of data are a better input than raw data because they provide the model with richer context and a clearer framework for interpreting and cross-referencing information, especially with spatial relationships. By supplying the two reconstructed forms, the LLM may draw connections between them, helping the LLM to identify patterns, inconsistencies, and/or dependencies that might be overlooked if only one form was provided. This dual structure also enables the LLM to validate information between the forms, reducing errors, and/or improving the reliability of its output. For example, a first reconstructed form may represent spatial information in an image using boxed coordinates, whereas the second reconstructed form indicates spatial information using text spaces.

However, the use of two reconstructed forms, raises a novel technical challenge in that the LLM may not understand how to interpret the two forms. For example, the LLM may not understand that the two forms relate to the same information being extracted (e.g., the same image) as opposed to two different sets of images. Moreover, the LLM may not understand how the two forms relate to each other. To overcome this novel technical problem, the systems and methods generate a custom prompt for the LLM that includes not only the two reconstructed forms but also instructions for processing each. For example, the inclusion of instructions ensures that the model understands how to interpret positional relationships and/or how data in one form relates to the other. The instructions further guide the LLM on how to process each form independently while maintaining a holistic understanding of their interaction. For example, instructions might specify that numerical values in one form correspond to spatial coordinates in another or that data points should be grouped based on proximity or shared attributes. This structured approach not only enhances the LLM's ability to process complex, multi-faceted inputs but also ensures that the nuances of spatial or relational information are preserved and accurately interpreted.

In some aspects, systems and methods for analyzing images to generate textual extractions are described. For example, the system may receive a first image, wherein the first image comprises first textual data at a first pixel in the first image. The system may process the first image to generate a bifurcated reconstruction of the first image, wherein the bifurcated reconstruction comprises a first reconstructed form comprising a first text string based on the first textual data and a first coordinate based on the first pixel, wherein the bifurcated reconstruction comprises a second reconstructed form comprising a character-based, textual image reconstruction based on the first image, wherein the character-based, textual image reconstruction comprises a first character based on the first textual data at a position in the character-based, textual image reconstruction based on the first pixel. The system may generate a first model prompt comprising the first reconstructed form, the second reconstructed form, and textual instructions for processing the first reconstructed form and the second reconstructed form. The system may generate, based on inputting the first model prompt into a first model, a first extraction of the first image based on the first model prompt.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 2B shows an illustrative diagram of a first form of a bifurcated representation of content, in accordance with one or more embodiments.

FIG. 2D shows an illustrative diagram of form instructions, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
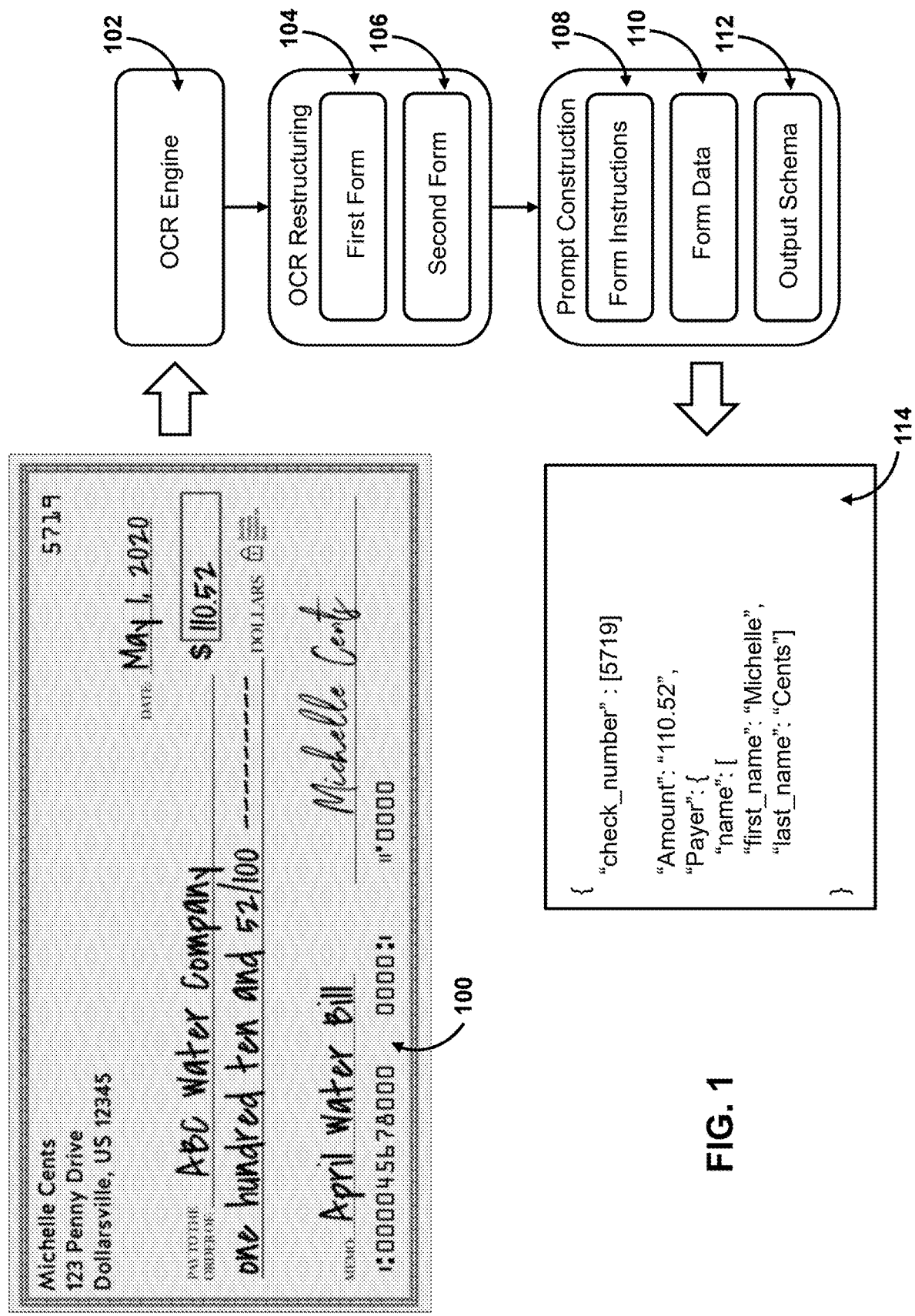
FIG. 1 shows an illustrative diagram for processing content, in accordance with one or more embodiments.

FIG. 1 shows an illustrative diagram for processing content, in accordance with one or more embodiments. For example, FIG. 1 shows content 100. In some embodiments, content 100 may represent any data that requires text extraction, text recognition, and/or other processing. As another example, content 100 may be data that requires information extraction where spatial awareness is a necessity. As shown in FIG. 1, content 100 may represent a check or other document in which textual information is embedded within visual or non-textual formats. This may include scanned documents, images of handwritten or printed text, digital photographs, PDFs, and complex multimedia files. Such content often requires specialized techniques to extract, interpret, or transform textual data into a machine-readable or analyzable format. Examples of images that may require text extraction include photographs of street signs, labels, or menus, where identifying and interpreting text is crucial for navigation or information retrieval. Documents such as scanned contracts, receipts, invoices, and forms often contain important textual data that must be recognized and digitized for storage, analysis, or compliance purposes. Similarly, visual content like diagrams, charts, or infographics often combines textual and graphical elements, necessitating the extraction of text to understand or repurpose the information. Other content, such as subtitles in video frames, license plates in surveillance footage, or medical reports with handwritten notes, may also require text recognition for further processing. These tasks are essential for enabling automated workflows, enhancing accessibility, and supporting data analysis across diverse applications.

The system may receive an image of a document (e.g., content 100) for processing, wherein the image comprises textual data corresponding to a plurality of pixels in the image. The system may process, using an object character recognition model (e.g., OCR engine 102), the image to generate a bifurcated reconstruction of the image based on detected patterns. For example, following the initial processing by OCR engine 102, the system may process the image (e.g., content 100) to generate a bifurcated reconstruction by employing an object character recognition (OCR) restructuring component, to detect and analyze textual patterns within the image. The process may begin with the OCR model analyzing the image to identify regions containing potential text based on patterns such as shapes, contours, or pixel arrangements that resemble alphanumeric characters. These regions may be isolated and further processed to recognize and extract the textual data embedded within them. Once the textual data is extracted, the system may use the OCR model to determine the spatial coordinates of the identified text within the image, linking each piece of text to its corresponding pixel location. With this information, the system generates the first form (e.g., form 104) of the bifurcated reconstruction-a structured representation that includes the recognized text and its associated spatial data. This form enables precise textual data analysis and retrieval.

Simultaneously, the system may create the second form (e.g., form 106) of the bifurcated reconstruction by modifying the original image to incorporate the detected text visually. For instance, the extracted text may be represented as characters overlaid at their original locations or as annotations that highlight their position in the image. This second reconstructed form provides a counterpart to the textual data that preserves the spatial information, ensuring that the reconstruction maintains the contextual and spatial relationships inherent in the original image. By leveraging detected patterns through the OCR model, the system creates a bifurcated reconstruction that combines structured textual data with visual context, facilitating robust analysis and enabling diverse downstream applications.

The system may perform a prompt construction by combining form instructions specific to the different forms in the bifurcated reconstruction (e.g., instruction 108), form data generated by the system (e.g., data 110), and instructions/descriptions for a required output (e.g., output schema 112). The system may then generate output 114 based on a prompt comprising the bifurcated reconstruction (e.g., instruction 108), form data generated by the system (e.g., data 110), and instructions/descriptions for a required output (e.g., output schema 112).

For example, a system performs prompt construction by integrating various components—form-specific instructions, form data, and output requirements—into a cohesive and structured format. This process begins with the system referencing form instructions specific to each form in the bifurcated reconstruction. These instructions (e.g., instruction 108) provide detailed guidance on how the first reconstructed form (e.g., textual data with spatial coordinates) and the second reconstructed form (e.g., a visual representation of the image) should be processed and interpreted. These instructions ensure that the system handles each form appropriately, maintaining their individual characteristics while aligning them with the overall task. Next, the system incorporates form data generated during the reconstruction process (e.g., data 110). This includes the actual textual content, spatial metadata, and visual elements extracted from the image. The form data serves as the input that the constructed prompt will direct the model to analyze or process. Additionally, the system integrates instructions or descriptions for the required output (e.g., output schema 112), which define the structure, format, and content expectations for the desired result. These instructions might specify tasks such as summarization, contextual analysis, or reformatting, ensuring that the prompt aligns with the intended use case. By combining these components, the system generates a unified prompt to create a model output (e.g., output 114) that encapsulates all necessary information for the model to execute the desired task. The prompt includes clear instructions for processing each reconstructed form, relevant input data, and precise guidelines for producing the required output. This structured approach to prompt construction ensures consistency, accuracy, and relevance in downstream processing, enabling the model to effectively interpret and act on the provided data.

For example, the system may generate a model prompt comprising the first reconstructed form, the second reconstructed form, and textual instructions by assembling these components into a structured input designed for the target model. The process begins with the first reconstructed form, which includes textual data extracted from the image (e.g., a string of text) and its corresponding spatial metadata (e.g., coordinates or pixel positions). Next, the second reconstructed form is incorporated, representing the visual aspect of the image. This may be a modified version of the original image with highlighted. The second reconstructed form provides the model with contextual information that complements the first reconstructed form, ensuring the model can analyze both textual, and visual elements represented by the text, cohesively. Finally, the system generates textual instructions that define how the model should process these forms. These instructions specify the relationships between the reconstructed forms and guide the model in performing tasks such as correlating textual data with its visual representation, extracting insights, or generating a extraction. For example, the instructions might direct the model to identify patterns, analyze spatial relationships, or synthesize the combined data into a coherent output. The system may then combine these components-textual data, text describing the visual representation of the textual data, and processing instructions-into a single, comprehensive model prompt. This prompt is formatted in a way that ensures compatibility with the target model, enabling it to interpret and execute the specified tasks accurately and efficiently.

Output 114 may then be determined based on a prompt submitted to an LLM and/or other model to perform a network task. For example, once the prompt is prepared, the system establishes communication with the LLM or relevant model via an API or other network interface. The prompt may be transmitted as part of a request payload, often accompanied by additional parameters such as model selection, temperature settings, or constraints that influence the model's behavior.

After submission, the LLM or model processes the prompt, interpreting the input data and executing the specified network task. This task may involve generating a extraction, performing an analysis, or transforming the data into the desired output format. The system then receives the model's response, which it can further process, validate, or integrate into downstream workflows. By submitting the prompt effectively, the system ensures accurate and reliable execution of complex tasks across a range of applications. For example, the system may generate, based on inputting the model prompt into a model, an extraction of the image based on the model prompt. The system generates an extraction of an image by inputting the model prompt into a trained model, which processes the provided data and instructions to produce the desired output. The model prompt may include the first reconstructed form (e.g., textual data and its spatial coordinates), the second reconstructed form (e.g., a version with spatially-annotated text of the image), and detailed textual instructions that specify the task of summarizing the image. Upon receiving this prompt, the model interprets the input data by analyzing the textual and visual components in tandem.

The first reconstructed form enables the model to extract and understand key textual elements within the image, leveraging metadata such as spatial coordinates to contextualize the text. The second reconstructed form provides a spatially-annotated text reference, allowing the model to interpret graphical or positional relationships between text and other elements in the image. Guided by the textual instructions in the prompt, the model synthesizes these inputs to identify essential themes, relationships, and relevant details within the image.

Using this combined analysis, the model generates a coherent extraction that captures the core information and purpose of the image. This extraction might highlight significant textual content, describe visual patterns, or explain the interplay between text and visuals. The system retrieves this extraction as the model's output, ensuring it aligns with the task's requirements and the user's intent. This process allows the system to produce a high-level textual representation of the image, enabling efficient interpretation and downstream utilization of the summarized content.

Figure 2A:
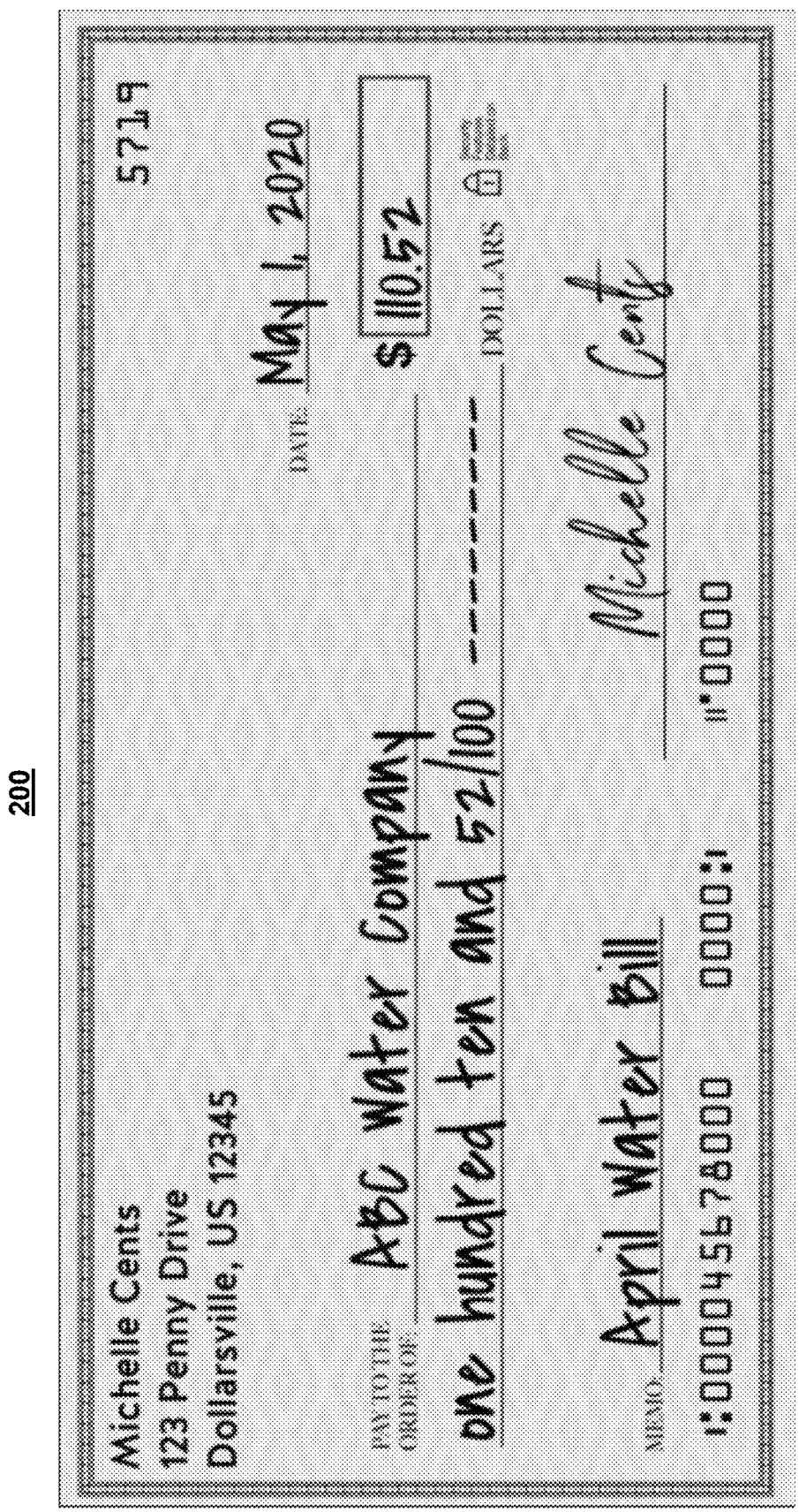
FIG. 2A shows an illustrative diagram for native content available for processing, in accordance with one or more embodiments.

FIG. 2A shows an illustrative diagram for native content available for processing, in accordance with one or more embodiments. For example, the system may extract data from the native content (e.g., content 200) to complete one or more network tasks. Native content that needs to be extracted may refer to data embedded within documents, images, or digital formats that are not inherently structured for easy processing. In the financial services industry, this often includes textual, numerical, or graphical information stored in formats like scanned documents, PDFs, images of forms, or unstructured reports. This content is typically not directly accessible or machine-readable, requiring specialized extraction techniques such as OCR, natural language processing (NLP), or data parsing.

Examples of native content in the financial services industry include transaction details on bank statements, account numbers, and customer information on scanned identification documents. Other examples are contract terms and clauses in loan agreements, numerical data such as interest rates and payment schedules in mortgage documents, and expense categories on receipts submitted for reimbursement. Additionally, financial reports and earnings statements may include embedded tables or charts that need to be converted into structured data for analysis. Extracting such native content allows financial institutions to automate processes, ensure compliance, and derive actionable insights from unstructured data sources.

Native content can be categorized into several types based on its nature and the format in which it is embedded. These categories include textual content, numerical data, graphical elements, tabular data, and metadata. Textual content consists of written information such as paragraphs, sentences, or labels, often found in documents, forms, or images. Examples include names, addresses, legal terms, and descriptive text. Numerical data includes figures such as amounts, percentages, dates, and statistical values, commonly found in financial statements, invoices, or performance reports.

Graphical elements encompass visual content such as charts, diagrams, or illustrations that convey information visually. These are often found in presentations, reports, and infographics. Tabular data refers to structured information presented in rows and columns, such as spreadsheets, tables in reports, or forms with predefined fields. This category is prevalent in documents like balance sheets, expense reports, and data grids. Lastly, metadata involves supplementary information about the content, such as timestamps, author details, or geolocation tags, which provide context for the primary data. Recognizing and categorizing these types of native content is essential for effectively extracting, organizing, and analyzing unstructured or semi-structured information.

FIG. 2B shows an illustrative diagram of a first form of a bifurcated representation of content, in accordance with one or more embodiments. For example, the system may generate form 220 based on content 200 (FIG. 2A). Form 220 may include a first reconstructed form comprising a plurality of text strings, wherein each of the plurality of text strings occupies a single line of the first reconstructed form, wherein each of the plurality of text strings corresponds to a respective portion of the textual data as detected in the image by the object character recognition model and a respective coordinate in the image of a respective subset of pixels of the plurality of pixels corresponding to the respective portion.

For example, the system may generate a first reconstructed form comprising a plurality of text strings by processing the textual data detected in an image using an OCR model. The OCR model scans the image to identify and extract textual content, breaking it down into smaller segments, each corresponding to specific portions of the text. For each detected text string, the system determines its spatial relationship within the image by identifying the coordinates of the subset of pixels where the text resides. These coordinates provide precise location data, ensuring that each text string can be mapped back to its original position in the image.

The system then organizes the extracted text strings such that each occupies a single line in the first reconstructed form. This line-by-line arrangement simplifies the structure, making it easier to interpret and process. Each text string in the reconstructed form is linked to its respective spatial coordinate, enabling downstream tasks to associate the textual content with its visual context. By combining the textual data and its corresponding pixel-level coordinates, the first reconstructed form provides a structured representation of the image's content, maintaining both the semantic meaning of the text and its spatial alignment within the image. This representation is essential for tasks like document parsing, content analysis, or visualization.

Notably, a single line of text for each string is easier for a model to understand because it simplifies the structure of the input, making the textual data more linear and organized. For models, particularly large language models (LLMs), such simplification reduces ambiguity and minimizes the need to interpret complex layouts or hierarchies. By presenting each text string on a single line, the input eliminates extraneous formatting, allowing the model to focus on the semantic content of the text. This format ensures that relationships between different pieces of text are clear and easy to process.

For LLMs, the single-line format is particularly advantageous because these models are designed to work with sequences of text tokens. Linearizing the data into single-line strings aligns with the way LLMs tokenize and process input, enabling them to efficiently encode and interpret the content. Additionally, the structured, one-line-per-string format minimizes the potential for misinterpreting spatial or contextual relationships inherent in more complex layouts, such as multi-column documents or overlapping text. This simplicity reduces cognitive overhead for the model and optimizes its ability to generate accurate outputs, making the single-line approach an effective strategy for tasks involving textual data extraction and analysis.

Figure 2C:
FIG. 2C shows an illustrative diagram of a second form of a bifurcated representation of content, in accordance with one or more embodiments.

FIG. 2C shows an illustrative diagram of a second form of a bifurcated representation of content, in accordance with one or more embodiments. For example, the system may generate form 230 based on content 200 (FIG. 2A). Form 230 may include a second reconstructed form comprising an ASCII image reconstruction based on the image, wherein the ASCII image reconstruction comprises a first ASCII character based on the textual data at a position in the image based on the respective subset of pixels. For example, the system may generate a second reconstructed form comprising an ASCII image reconstruction by converting the visual and textual content of the original image into a structured grid of ASCII characters while preserving spatial information. The process begins with the system analyzing the image to identify regions of interest, such as areas containing textual data. Using an OCR model, the system detects and extracts the textual data from these regions, associating each portion of the text with the subset of pixels it occupies in the image. For each detected text string or character, the system may select a corresponding ASCII character based on the recognized textual data. It then maps this ASCII character to a position in the reconstructed form that aligns with the spatial location of the text in the original image. This mapping is guided by the pixel coordinates of the subset associated with each portion of the textual data, ensuring that the ASCII representation preserves the relative positioning and layout of the text in the image. For example, as opposed to the first reconstructed form where spatial information is represented by boxed coordinates, the second reconstructed form indicates spatial information using text spaces.

The resulting ASCII image reconstruction is a grid-like representation that approximates the structure of the original image using text-based characters. This form captures both the visual layout and the content of the original image in a simplified, text-readable format, enabling easy interpretation and processing by systems and users. The second reconstructed form serves as a compact and visually interpretable representation, useful for tasks like data visualization, content validation, or embedding textual data in systems that prioritize simplicity and textual encoding.

An ASCII character is a textual symbol encoded according to the American Standard Code for Information Interchange (ASCII), a character encoding standard used in computing and communication systems. ASCII defines a set of 128 characters that include letters (both uppercase and lowercase), digits, punctuation marks, and control characters such as newline and tab. Each ASCII character is represented by a numerical code ranging from 0 to 127, making it easily interpretable by computers and other digital devices. The standard characters include commonly used symbols like letters (A-Z and a-z), numbers (0-9), and special characters (e.g., @, #, $, %, &, *, !). ASCII characters are foundational in programming, text processing, and data communication because of their simplicity and universality.

An image represented with ASCII characters is easier for a model to understand because it simplifies complex visual data into a structured, text-based format. This transformation reduces the image's pixel-level complexity, translating visual patterns into recognizable symbols arranged in a grid. For models, particularly large language models (LLMs), ASCII representations are advantageous because they operate natively on text and are optimized to process sequences of characters and tokens. By converting an image into ASCII, the visual information becomes a textual input, eliminating the need for additional image processing models or specialized tools to interpret pixel data.

For LLMs, ASCII image reconstructions are particularly easier to process because the models are pre-trained on large amounts of textual data, including characters, patterns, and layouts similar to ASCII representations. This familiarity allows LLMs to interpret and analyze the arrangement of ASCII characters as meaningful sequences rather than raw image data. Additionally, ASCII simplifies spatial relationships into linear text structures, making it easier for LLMs to recognize patterns, alignments, and content. This textual abstraction aligns perfectly with the strengths of LLMs, enabling them to efficiently process and analyze information while avoiding the computational overhead of handling complex image files.

FIG. 2D shows an illustrative diagram of form instructions, in accordance with one or more embodiments. For example, the system may generate instructions 240 based on content 200 (FIG. 2A). Instructions 240 may comprise textual instructions for processing the first reconstructed form and the second reconstructed form. For example, the system may generate or receive textual instructions for processing the first reconstructed form and the second reconstructed form through predefined rules, templates, or dynamic input mechanisms. These instructions provide detailed guidance on how the two forms should be analyzed, correlated, or transformed to achieve the desired output. If the system generates the instructions, it typically relies on a set of programmed rules or algorithms that analyze the context and content of the reconstructed forms. For instance, the system may use predefined templates to instruct the processing of the first reconstructed form (e.g., extracting keywords or categorizing text) and the second reconstructed form (e.g., interpreting spatial patterns or visual layouts).

Alternatively, the instructions may be received as input from external sources, such as user-defined prompts, API requests, or integrated workflows. In such cases, the textual instructions specify the objectives and processing requirements for each reconstructed form, such as aligning text strings with visual data, identifying key elements, or summarizing the combined content. These instructions are typically written in a structured and concise format that the system or a downstream model can interpret easily. By generating or receiving these textual instructions, the system ensures that the first and second reconstructed forms are processed in a manner tailored to the specific application, enabling accurate and efficient analysis or output generation.

For example, as shown in FIG. 2D, instructions 240 may describe how to process two types of OCR data: Coordinate Form Data Extraction and ASCII Art Form Data Extraction. For example, instructions 240 state that in the Coordinate Form Data Extraction format, each line of text is associated with bounding box coordinates, which are organized in an anti-clockwise sequence starting from the bottom-left corner. The bounding box includes four key points: [x1, y1] for the bottom-left, [x2, y2] for the bottom-right, [x3, y3] for the top-right, and [x4, y4] for the top-left. This structured arrangement helps reconstruct the spatial layout of the text in the original image by defining its precise placement.

Instructions 240 may describe how the prompt should be processed and/or what preprocessing steps have already been taken. For example, instructions 240 state that in the ASCII Art Form Data Extraction format, the bounding box data from multiple lines is aggregated into a 3D matrix with the shape (Text Line, Bounding Boxes, x-y coordinates). A normalization process, called min-max scaling, is then applied to the coordinates to scale all values between 0 and 1 based on the desired canvas size. The scaling formula: $X_{scaled}=(X-X_{min})/(X_{max}-X_{min})$, ensures that the coordinates fit within the defined canvas dimensions while preserving their relative spatial arrangement. This scaled matrix is then used to prepare the data for plotting or creating an ASCII art representation of the text, allowing the spatial relationships of the original content to be visualized effectively. For example, min max scaling may be a post processing step taken for OCR data while constructing the ASCII form. Once the ASCII form is constructed, the form is then injected into the final prompt that is sent to the model. In some embodiments, the system may describe that min max scaling was performed in the instructions to further enhance the processing of the prompt.

Figure 3:
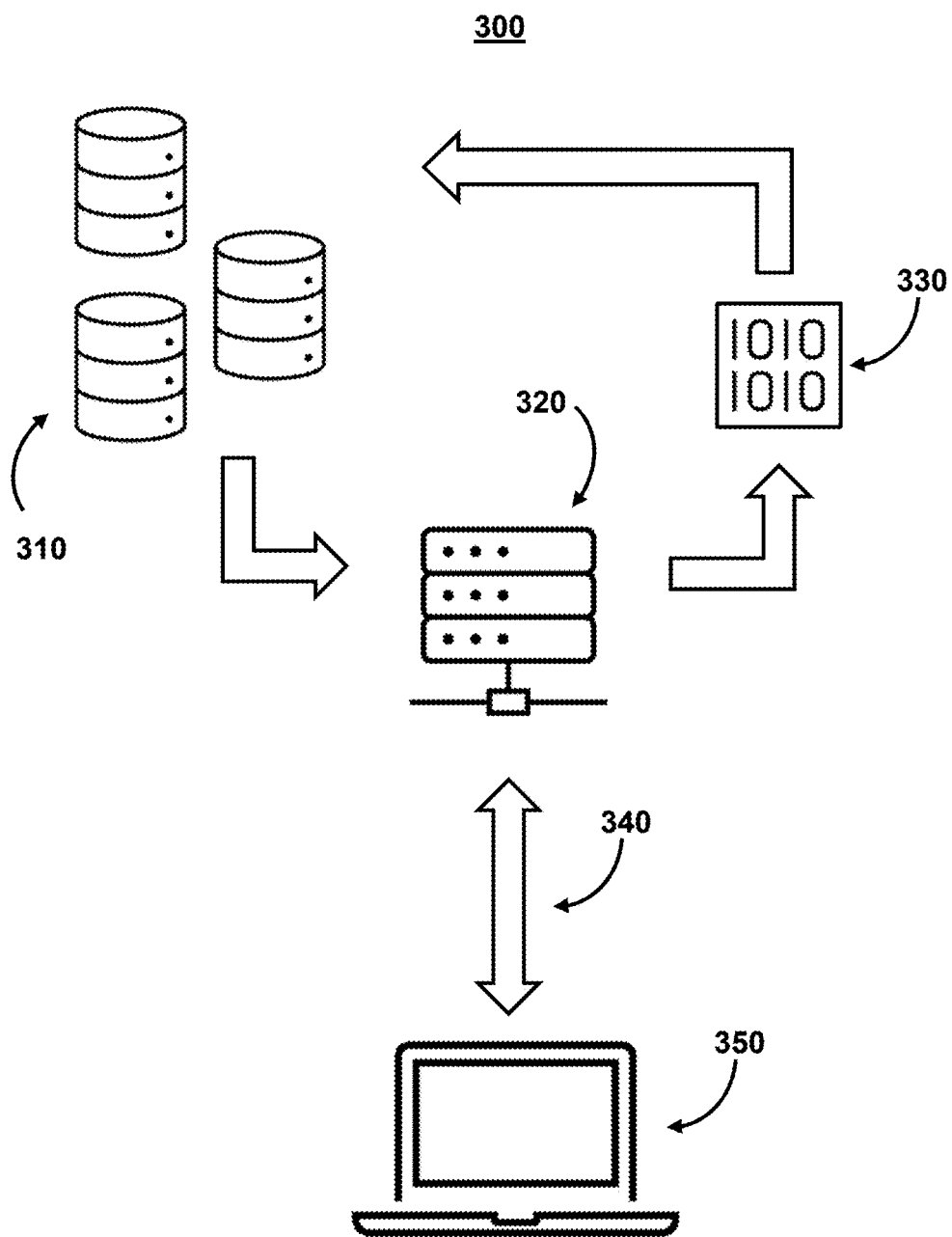
FIG. 3 shows illustrative components for a system used to process data, in accordance with one or more embodiments.

FIG. 3 shows an illustrative component for a system used to process data, in accordance with one or more embodiments. For example, FIG. 3 may show illustrative components for analyzing images to generate textual extractions using bifurcated image reconstructions. As shown in FIG. 3, system 300 may include device 310. Device 310 (as well as the other devices and components described herein) may comprise electronic storage. Electronic storage devices are systems designed to electronically store information in various formats and media. These devices may utilize non-transitory storage and/or computer-readable media to retain data and can include both system storage, which is integrally provided within servers or client devices (e.g., substantially non-removable storage), and removable storage that can be connected to servers or client devices through interfaces such as USB ports, FireWire ports, or disk drives. Electronic storage media encompass a wide range of technologies, including optically readable storage media like optical disks, magnetically readable storage media such as magnetic tapes, hard drives, and floppy disks, as well as electrical charge-based storage media like EEPROM and RAM. Solid-state storage media, such as flash drives, are another common type of electronic storage. Additionally, virtual storage resources, including cloud storage, virtual private networks (VPNs), and other virtualized systems, are considered part of electronic storage. These devices are capable of storing various forms of data, including software algorithms, information processed or determined by processors, data obtained from servers or client devices, and other essential information that supports the functionality of various processes.

In some embodiments, system 300 and/or one or more components herein may be implemented using an application specific integrated circuit. An integrated circuit may be a small electronic device made of semiconductor material, typically silicon, that contains a large number of microscopic electronic components such as transistors, resistors, capacitors, and diodes. These components are interconnected to perform a specific function or set of functions. Integrated circuits can be classified into various types based on their functionality, such as analog, digital, and mixed-signal ICs. The transistors within an IC are the primary building blocks, as they act as switches or amplifiers for electronic signals. The other components, like resistors and capacitors, are used for controlling voltage, current, and timing within the circuit. System 300 may design the integrated circuit to be application specific such that design of the circuit is customized for a given application. In some embodiments, system 300 may use an integrated circuit system where one or more integrated circuit are spread throughout a system, network, and/or one or more devices. In such case, the system design may ensure that the circuits are integrated with other electronic components like connectors, power supplies, and sensors to form a complete and functional electronic system. This integration allows for the implementation of sophisticated tasks in devices needed for one or more specified applications.

System 300 may send and/or receive data to device 320, which may generate output 330. System 300 may facilitate the transfer of data between device 310 and device 320, enabling the generation of output 330. Device 310, which functions as a storage device, holds the data that is sent to device 320, such as a CPU. A CPU, or Central Processing Unit, is the primary component of a computer responsible for executing instructions and performing computations necessary for various processes and functions. The CPU may interpret and execute instructions from programs and operating systems through a cycle of fetching, decoding, and executing commands. This cycle begins with the CPU retrieving an instruction from the system's memory, followed by decoding it to understand the required operation, and finally executing it by performing arithmetic, logical, control, or input/output tasks. The CPU relies on its internal components, including the arithmetic logic unit (ALU) for mathematical operations, the control unit (CU) for directing data flow, and registers for temporary data storage. By leveraging its clock speed and multiple cores in modern processors, the CPU can execute complex processes efficiently, enabling the functionality of applications and systems.

Device 320 processes the received data by implementing one or more applications and/or models to perform specific tasks or computations. These applications or models analyze, transform, or process the input data to produce the desired output 330. This output may represent the results of calculations, simulations, or other operations conducted by the applications or models on device 320. The system ensures seamless communication between the devices, allowing for efficient data transfer and output generation.

Output 330 may represent the result of processing data or executing instructions. In the case of a CPU, outputs can include processed data, computational results, or responses to input commands. For models, outputs often consist of predictions, classifications, decisions, or other data derived from the model's algorithms or trained parameters. Once generated, the output is typically stored in a suitable storage medium, such as system memory (RAM), a local storage device (e.g., hard drive or SSD), or a networked storage system. This stored output can then be used in various ways depending on the application. For example, it might be displayed to users as visual or textual information, serve as input for subsequent computational tasks, or be transmitted to other devices or systems for further processing. The efficient storage and utilization of outputs are essential for enabling real-time responsiveness, supporting iterative processes, and ensuring seamless integration with larger workflows or systems.

System 300 may also include terminal 350. Terminal 350 may include a user interface that may be used to interact with one or more components in system 300. As referred to herein, a "user interface" may comprise a human-computer interaction and communication in a device, and may include display screens, keyboards, a mouse, and the appearance of a desktop. For example, a user interface may comprise a way a user interacts with an application or a website. As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user generated content may include content created and/or consumed by a user. For example, user generated content may include content created by another, but consumed and/or published by the user.

Users may interact with a system through various types of terminals in system 300 (although only a single terminal is shown for simplicity), which serve as access points for communication and control. Terminals can include traditional devices such as desktop computers, laptops, and workstations, which often feature input peripherals like keyboards and mice and output peripherals like monitors. Mobile devices, such as smartphones and tablets, provide touchscreens and voice recognition as primary interaction methods, offering portability and convenience. Specialized terminals, such as kiosks, point-of-sale (POS) systems, or industrial control panels, are designed for specific applications, often with simplified interfaces like touchscreens or dedicated buttons. Wearable devices, including smartwatches and augmented reality (AR) glasses, offer hands-free interaction via gestures, voice commands, or sensors. Users may also engage with systems through virtual assistants, using voice-based interactions, or through command-line interfaces for text-based commands. Other interaction methods include haptic feedback, biometric inputs (e.g., fingerprint or facial recognition), and adaptive technologies like eye-tracking for users with disabilities. These diverse terminals and interaction methods enable systems to cater to various use cases, environments, and user preferences.

An Input/Output (I/O) path refers to the communication pathway that facilitates the exchange of data between computing devices or systems. I/O path 340, for instance, may encompass a variety of communication networks such as the Internet, mobile phone networks, mobile voice or data networks like 5G or LTE, cable networks, public switched telephone networks (PSTN), or combinations of these. These networks provide the infrastructure for transmitting data across different mediums. The I/O path can also include specific communication paths, such as satellite links, fiber-optic connections, cable connections, Internet-based communication paths (e.g., IPTV), and free-space links that support wireless or broadcast signals. In addition to external communication networks, computing devices may feature internal communication paths that integrate hardware, software, and firmware components. For example, multiple computing devices can operate as part of a unified cloud-based platform, leveraging interconnected communication paths to function collectively. These I/O paths are essential for ensuring seamless data flow, supporting applications, and enabling distributed computing environments.

In some embodiments, system 300 may be a cloud system. A system structured as a cloud system is designed to provide scalable, on-demand access to computing resources and services over the Internet or other networks. In a cloud system, multiple interconnected servers, data centers, and storage devices work together to deliver virtualized computing power, storage, and applications. These resources are hosted remotely in distributed locations, creating a virtualized environment that can dynamically allocate resources based on user demands. The cloud system is typically organized into three main service models: Infrastructure as a Service (IaaS), which offers virtualized hardware and network resources; Platform as a Service (PaaS), which provides tools and frameworks for application development; and Software as a Service (SaaS), which delivers software applications to users. The system relies on communication paths, including high-speed fiber-optic networks, satellite links, and wireless connections, to enable seamless interaction between users and the cloud infrastructure. Advanced management tools and load-balancing mechanisms ensure reliability, efficiency, and fault tolerance within the system. This structure allows users to access computing resources flexibly and cost-effectively without the need to maintain physical hardware.

In some embodiments, system 300 may use one or more APIs. An API, or Application Programming Interface, is a set of rules and protocols that allows different components within a system, such as system 300, to communicate and interact seamlessly. APIs define how software applications, services, or devices can request and exchange data, enabling interoperability between components regardless of their underlying technologies. Within a system, an API acts as a bridge between different modules, such as databases, user interfaces, or external services, facilitating the flow of information and the execution of commands.

For instance, in system 300, an API might enable device 310, a data storage component, to provide information to device 320, a processing unit. Device 320 could use the API to request specific data, execute operations, or send processed results back to another component. The API specifies the format and structure of the requests and responses, such as using JSON or XML, and enforces security protocols like authentication tokens or encryption to ensure secure communication.

APIs can also enable external systems to interact with system 300. For example, a financial application could use an API to query account balances, initiate transactions, or retrieve fraud detection reports generated by a model housed within the system. By standardizing interactions, APIs simplify the integration of diverse components, improve scalability, and support modular system designs, making it easier to expand or update individual parts without disrupting the entire system.

Figure 4:
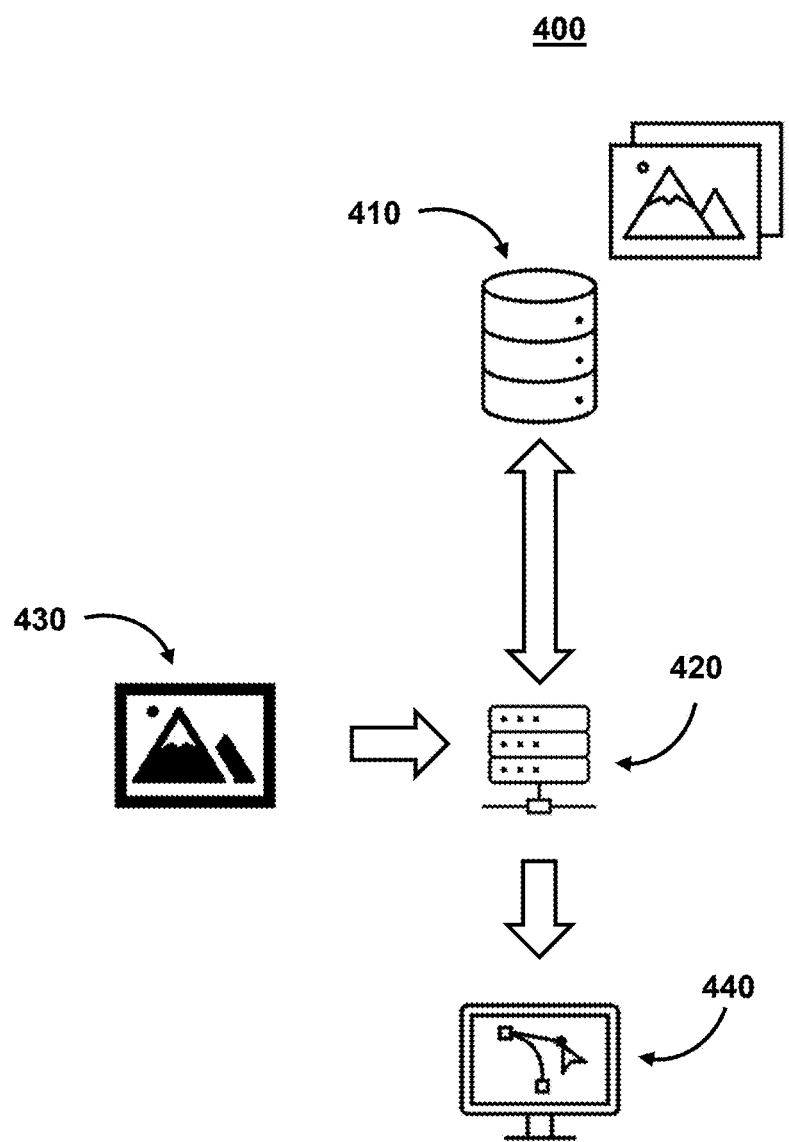
FIG. 4 shows illustrative components involved in training a model, in accordance with one or more embodiments.

FIG. 4 shows illustrative components involved in training a model, in accordance with one or more embodiments. For example, FIG. 4 may show illustrative components for analyzing images to generate textual extractions using bifurcated image reconstructions. System 400 may comprise one or more artificial intelligence (AI) and/or machine learning (ML) models. AI and ML models are computational systems designed to perform tasks that typically require human intelligence, such as recognizing patterns, making predictions, and learning from data. AI models encompass a broad range of techniques, including rule-based systems, natural language processing, and deep learning, to simulate intelligent behavior. ML, a subset of AI, focuses on developing algorithms that allow models to learn and improve their performance from data without being explicitly programmed. ML models are trained on large datasets to identify patterns and relationships, enabling them to make predictions, classify information, or automate decision-making processes. These models can be supervised, where they learn from labeled data; unsupervised, where they identify patterns in unlabeled data; or reinforced, where they learn through trial and error using feedback. Examples of a model may include neural networks for image recognition, decision trees for predictive analytics, and transformers for language understanding. AI and ML models are used in various fields, such as healthcare, finance, transportation, and entertainment, to drive innovation and enhance efficiency.

In should be noted that system 400 may also include non-AI models. Non-AI models are computational or mathematical models that do not rely on AI or ML techniques. Instead, they use predefined rules, equations, or algorithms to simulate processes, analyze data, or solve problems based on established principles. Examples of non-AI models include statistical models, such as linear regression and logistic regression, which are used to identify relationships between variables and make predictions; deterministic models (e.g., Newtonian mechanics or circuit analysis); and rule-based systems, where a set of predefined rules governs decision-making or problem-solving.

Non-AI models may be implemented by programming the underlying rules, equations, or algorithms directly into software or hardware. For instance, statistical models are implemented using mathematical libraries or statistical software, while rule-based systems are often coded into decision-support applications. Deterministic models can be built using simulation software or computational frameworks that apply known physical laws. These models require precise inputs and often operate in scenarios where variability is minimal or well-understood. While non-AI models lack the adaptability and learning capabilities of AI models, they are often faster, more transparent, and easier to validate, making them suitable for well-defined problems with consistent parameters.

In some embodiments, system 400 may comprise a model that requires training. A model that requires training is a ML or AI model that learns patterns, relationships, or rules from a dataset to make predictions, classify information, or perform specific tasks. Training such a model involves exposing it to a labeled dataset—referred to as training data—that includes input features and corresponding outputs or labels. The model uses this data to iteratively adjust its parameters to minimize errors and improve its accuracy in predicting outputs for new, unseen inputs. Training mechanisms often rely on optimization algorithms, such as gradient descent, to update the model's weights based on a loss function, which measures the difference between predicted and actual outcomes.

Training data (e.g., training data 410) may serve as the foundation for the model's learning. It typically consists of structured examples where each instance includes input variables (e.g., images, numerical data, or text) and desired outputs. For example, in financial services, a model designed for check cashing based on images might use training data comprising scanned check images labeled with information such as amounts, payees, or account details. During training, the model learns to recognize patterns, such as handwriting styles or printed text, and correlates them with the appropriate output.

Training data 410 may be collected from various sources. For example, the system may collect training data by gathering and organizing relevant information from various sources to build a dataset that represents the problem the model is designed to solve. This process often begins with identifying the specific objectives of the model and determining the types of data required to achieve those goals. Training data can be collected from structured databases, such as financial transaction records or customer profiles, or unstructured sources, like images, videos, text documents, or audio files. In cases where labeled data is needed, annotations or labels are added manually by human experts or automatically using tools like OCR or NLP systems.

For example, in the context of check cashing, training data may include a large set of check images collected from banks, financial institutions, or customer uploads, along with corresponding metadata such as account numbers, payee details, and check amounts. Systems may also integrate data from online repositories, APIs, or real-time inputs from user interactions. Additionally, data preprocessing techniques, such as cleaning, normalization, and augmentation are applied to ensure the quality, consistency, and diversity of the dataset. Ethical considerations and data privacy may be important during data collection to ensure compliance with regulations and protect user information. Once collected, the training data is stored in a format that facilitates efficient access and processing during the model training phase, enabling the system to learn patterns and improve its performance.

Mechanisms used for training include supervised learning, where labeled data guides the model; unsupervised learning, where the model identifies patterns in unlabeled data; and reinforcement learning, where the model learns by receiving feedback in the form of rewards or penalties. In the case of check cashing, supervised learning would be employed, as labeled images of checks provide clear examples for the model to learn from. Techniques like convolutional neural networks (CNNs) are particularly effective for analyzing image data, enabling the model to extract features like text, logos, or signatures from checks. Once trained, the model can automate tasks such as fraud detection, data extraction, or account verification in financial services, improving efficiency and accuracy.

Using training data 410, system 400 may train a model housed at device 420. For example, system 400 trains a model housed at device 420 by using training data 410 as the foundational input to guide the learning process. The system begins by feeding the training data, which consists of input-output pairs or labeled examples, into the model located on device 420. The model processes these inputs and generates predictions or outputs. A loss function, designed to measure the difference between the model's predictions and the actual outputs in the training data, evaluates the accuracy of these predictions. Device 420 uses optimization algorithms, such as gradient descent, to adjust the model's parameters (e.g., weights and biases) in a way that minimizes this loss.

The training process may be iterative, meaning the system repeatedly passes the training data through the model, updates the parameters, and recalculates the loss until the model achieves a desirable level of accuracy, or the loss reaches an acceptable threshold. Techniques such as batching (processing subsets of the data at a time) and epoch cycling (repeating the full dataset through the model multiple times) are often used to improve efficiency and learning. During training, device 420 may leverage computational accelerators like GPUs or TPUs to handle the intensive computations required for large-scale datasets or complex models.

For instance, if system 400 is training an image recognition model for check cashing, the training data 410 might include labeled check images paired with corresponding metadata such as account numbers or check amounts. The model at device 420 learns to extract relevant features, such as text, logos, or handwriting styles, from the images. Over time, the adjustments made during training enable the model to accurately process new, unseen data for tasks like fraud detection or automated data entry.

A model housed on device 420, trained using training data 410, receives input 430 and processes it to generate output 440 through a sequence of computational steps. When input 430 is provided, it is first preprocessed, if necessary, to ensure compatibility with the model's architecture. Preprocessing may include normalization, resizing (for images), tokenization (for text), or encoding data into a structured format. Once the input is prepared, it is passed into the trained model on device 420.

The model processes the input using its learned parameters, which were optimized during the training phase using training data 410. The input flows through the model's layers, where features are extracted, transformed, and combined at various stages to derive meaningful representations. For example, in a deep learning model, convolutional layers might identify patterns like edges or shapes in images, while fully connected layers aggregate these patterns to make predictions or classifications. The final output, represented as output 440, is generated in the form of predictions, classifications, or extracted information, depending on the model's purpose. For instance, if the input 430 is a check image submitted for cashing, the model might process it to extract the written amount, payee name, and account details, producing output 440 as a structured data representation of the check's information. Output 440 can then be further utilized by downstream systems or presented to users, enabling efficient and automated processing of tasks.

A system uses a model to detect fraud or other problems in the financial services industry by analyzing data patterns, behaviors, and transactions to identify anomalies or indicators of fraudulent activities. The model, trained on historical data, learns to differentiate between normal and potentially fraudulent activities based on features like transaction amounts, frequency, locations, or user behavior. When the system receives new data, it processes the input through the model, which evaluates the data using the patterns it has learned. If the input deviates significantly from normal behavior or matches patterns associated with known fraud, the model flags it as suspicious. For example, in wire fraud detection, a machine learning model might analyze transaction data in real time to assess factors such as the amount spent, the transfer locations, and the user's transaction history. If the model detects an unusually large wire made in a foreign country shortly after another transaction in the user's home country, it could classify the transaction as potentially fraudulent. Similarly, for check processing, the system might use image recognition models to identify signs of tampering or mismatches between the written and printed information.

Once flagged, the system can trigger automated alerts, block the transaction, or escalate the case for human review. Advanced systems may also use feedback loops to improve over time, updating the model with newly confirmed cases of fraud to enhance detection accuracy. By leveraging models to monitor and analyze large volumes of data, financial systems can efficiently identify and mitigate fraud, minimize losses, and protect users.

In some embodiments, system 400 may use an LLM. An LLM is a type of machine learning model designed to process and generate human-like text by understanding the context, structure, and semantics of language. These models, such as GPT (Generative Pre-trained Transformer), are built using deep learning architectures, typically transformers, which enable them to handle large amounts of textual data and capture complex patterns and relationships within it. LLMs are trained on extensive corpora of text data from diverse sources, including books, articles, websites, and other textual content, to learn the nuances of grammar, syntax, and meaning.

Training an LLM involves two primary phases: pretraining and fine-tuning. In the pretraining phase, the model learns general language patterns by predicting missing words or sequences in the text (e.g., next-word prediction or masked language modeling). This phase typically uses unsupervised learning and massive computational resources to adjust the model's billions of parameters. In the fine-tuning phase, the model is adapted to specific tasks or domains by training it on a smaller, task-specific dataset using supervised learning or reinforcement learning techniques. This makes the model better suited for applications such as summarization, translation, or answering domain-specific questions.

Data is input into the model as text, typically formatted into tokenized sequences that the model can process. Tokenization involves breaking the input text into smaller units, such as words, subwords, or characters, which are converted into numerical representations understood by the model. Once the input is processed, the model uses its learned parameters to generate outputs, which could be responses, predictions, or classifications, depending on the application. Outputs are received as text, reconstructed from tokens into human-readable sentences or phrases. For example, when given a prompt about financial services, an LLM trained on financial datasets can generate detailed explanations, predictions, or suggestions relevant to that domain. Its ability to process vast amounts of data and generate coherent responses makes it a powerful tool for tasks such as customer support, content creation, and data analysis.

Inputting image data or other non-textual data into an LLM involves preprocessing and encoding the data into a format the LLM can interpret. Since LLMs are inherently text-based, non-textual data must first be transformed into textual or numerical representations. Advanced multimodal models, designed to handle multiple types of input such as text and images, achieve this through specialized components. For instance, image encoders like CNNs or vision transformers process image data into fixed-size numerical vectors or embeddings, which are then input to the LLM. Cross-modal embeddings further align these representations in shared latent spaces, enabling seamless interaction between modalities. Models like CLIP (Contrastive Language-Image Pretraining) align image and text embeddings, allowing them to be used interchangeably in various tasks.

For models that are not inherently multimodal, non-textual data can be converted into text-like structures. For example, images can be described using image captioning models to generate textual captions, while audio data can be transcribed into text using speech-to-text algorithms. Tabular or numeric data can be structured into formats like CSV or JSON, and feature embeddings extracted from non-textual data using pretrained encoders can be directly incorporated as input.

In multimodal models, separate encoders are often used for different data types, such as image or audio encoders, which are then combined with the LLM in a shared architecture. These models undergo multimodal pretraining on datasets pairing textual and non-textual data, such as image-caption pairs. Examples include ChatGPT with vision capabilities, which uses a vision encoder to preprocess images and integrate them into the language processing pipeline, and CLIP, which aligns text and image embeddings in a shared space.

In should be noted that various algorithms and training techniques may be used to train models and/or serve applications as described herein, depending on the type of data, the problem being solved, and the architecture of the model. Example algorithms include gradient descent and its variants, such as stochastic gradient descent, which iteratively updates model parameters to minimize a loss function. Advanced versions may optimize this process by adjusting the learning rate dynamically. For classification problems, models often rely on algorithms like logistic regression, decision trees, random forests, or support vector machines. For deep learning, architectures like CNNs are used for image-related tasks, while recurrent neural networks and transformers are preferred for sequence-based tasks, such as natural language processing.

Training techniques vary to improve efficiency and performance. Supervised learning uses labeled data, where the model learns by comparing predictions to known outcomes, while unsupervised learning identifies hidden patterns in unlabeled data. Semi-supervised learning combines both approaches, leveraging a smaller set of labeled data with a larger set of unlabeled data. Reinforcement learning allows models to learn through trial and error by interacting with an environment and receiving feedback in the form of rewards or penalties.

Other techniques include transfer learning, where a pre-trained model is fine-tuned on new data to save training time and resources, and ensemble learning, which combines predictions from multiple models to improve accuracy. Data augmentation, such as flipping or rotating images, and regularization methods, like dropout, are used to enhance generalization and prevent overfitting. These algorithms and techniques collectively enable the training of robust and efficient models tailored to diverse applications, from image recognition to financial forecasting.

Figure 5:
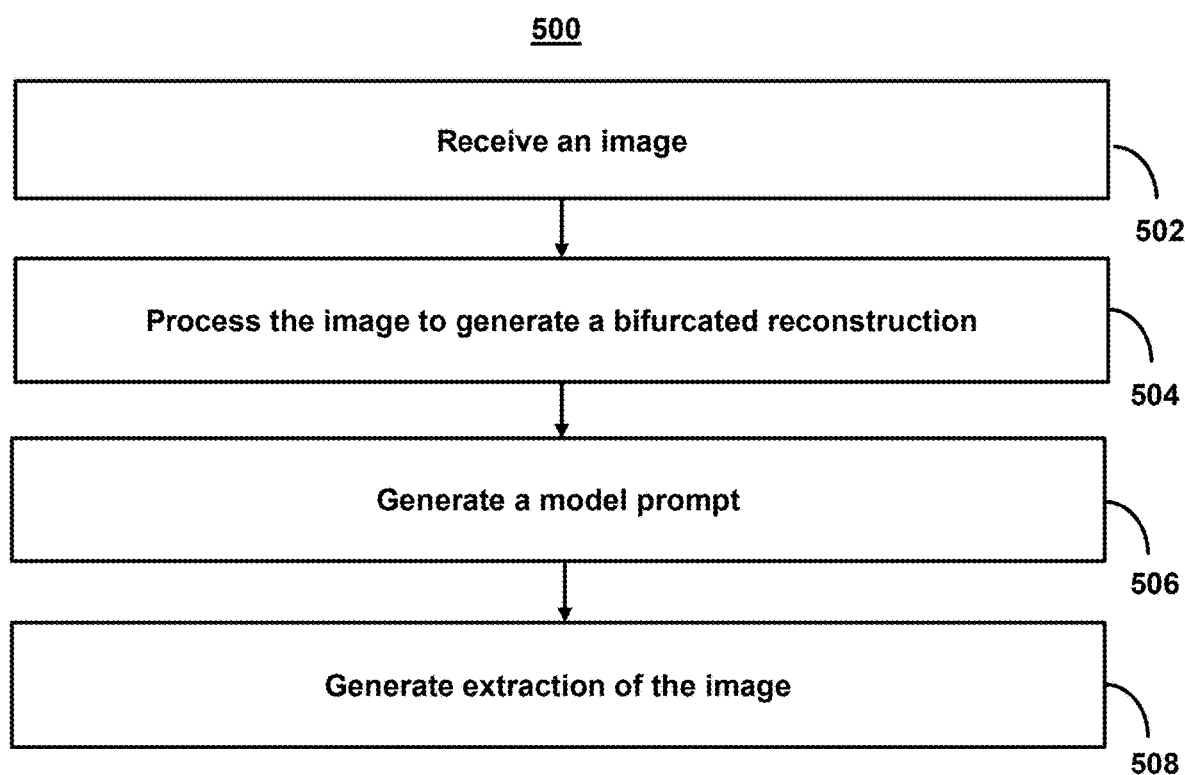
FIG. 5 shows a flowchart of the steps involved in generating textual extractions, in accordance with one or more embodiments.

FIG. 5 shows a flowchart of the steps involved in analyzing images to generate textual extractions, in accordance with one or more embodiments. For example, the system may use process 500 (e.g., as implemented on one or more system components described above) in order to analyze images to generate textual extractions using bifurcated image reconstructions.

At step 502, process 500 (e.g., using one or more components described above) receives an image. For example, the system may receive a first image, wherein the first image comprises first textual data at a first pixel in the first image. As an example, the system may receive an image by capturing or acquiring the digital representation of the visual data, typically in the form of a file or stream encoded in formats such as JPEG, PNG, or BMP. When the system receives the first image, it processes the image data to interpret its structure, including pixel-level details. The first image comprises a grid of pixels, each containing color and intensity values. Embedded within this image, specific data, such as textual information, may be encoded at particular pixel coordinates. For instance, first textual data can be located at a designated first pixel within the image, identifiable through its specific position in the grid. The system uses techniques like OCR or image decoding algorithms to extract and interpret this textual data for further processing or analysis. This capability allows the system to analyze, store, or manipulate the information conveyed within the image.

In some embodiments, the system may process the first image to generate the bifurcated reconstruction by inputting the first image into an object character recognition model to receive a first output and generating the bifurcated reconstruction based on the first output. For example, the system processes the first image to generate the bifurcated reconstruction by leveraging the capabilities of an OCR model. The process begins with the system inputting the first image into the OCR model, which analyzes the image to identify and extract textual data. The OCR model detects regions in the image containing text, processes these regions to recognize characters, and outputs structured data comprising the extracted text and its spatial information, such as bounding box coordinates or pixel-level locations. The system receives this first output from the OCR model and uses it to construct the bifurcated reconstruction. This reconstruction includes two distinct forms. The first reconstructed form organizes the recognized text and its corresponding spatial coordinates into a structured format, such as a line-by-line representation. This format retains the original alignment and positioning of the text as it appeared in the image, enabling precise analysis and interpretation. Simultaneously, the system uses the OCR output to create the second reconstructed form, which translates the image's textual and spatial data into a simplified visual or text-based representation, such as an ASCII art image. This form captures the spatial relationships and visual structure of the text, presenting it in a compact and easily interpretable manner. By integrating the first output from the OCR model into these two forms, the system ensures that the bifurcated reconstruction preserves both the textual content and its spatial context, enabling downstream applications such as data extraction, visualization, and analysis.

In some embodiments, the system may process the first image to generate the bifurcated reconstruction by receiving a machine-readable text format of the first textual data generating by an object character recognition model and applying an object character recognition restructuring protocol model to the machine-readable text format of the first textual data. For example, the system may process the first image to generate the bifurcated reconstruction by utilizing both an OCR model and an OCR restructuring protocol model to enhance and format the extracted data. The process begins with the system inputting the first image into an OCR model, which identifies and extracts textual data from the image. The OCR model converts this data into a machine-readable text format, typically including the recognized text and associated metadata such as spatial coordinates, bounding boxes, or line-by-line groupings. The system then applies an OCR restructuring protocol model to the machine-readable text format of the first textual data. This protocol model processes the raw OCR output to refine and organize the data into a structured and coherent format suitable for generating the bifurcated reconstruction. For example, the protocol model might align text with its spatial context, correct OCR errors, standardize text formatting, and categorize the data into meaningful groups, such as headers, body text, or annotations. Using the refined data from the restructuring protocol model, the system generates the first reconstructed form, which organizes the textual data and its spatial coordinates into a structured format, such as a line-by-line representation or a table. Simultaneously, the system uses the processed data to create the second reconstructed form, such as a text-based or visual representation (e.g., ASCII art) that preserves the spatial layout and visual structure of the original image. By combining the capabilities of the OCR model and the OCR restructuring protocol model, the system ensures that the bifurcated reconstruction captures both the textual content and its spatial relationships with high accuracy and clarity. This dual reconstruction facilitates efficient analysis, visualization, and downstream processing of the image's content.

At step 504, process 500 (e.g., using one or more components described above) processes the image to generate a bifurcated reconstruction. For example, the system may process the first image to generate a bifurcated reconstruction of the first image, wherein the bifurcated reconstruction comprises a first reconstructed form comprising a first text string based on the first textual data and a first coordinate based on the first pixel, wherein the bifurcated reconstruction comprises a second reconstructed form comprising a character-based, textual image reconstruction based on the first image, wherein the character-based, textual image reconstruction comprises a first character based on the first textual data at a position in the character-based, textual image reconstruction based on the first pixel. To generate a bifurcated reconstruction of an image, the system may process the input image through a series of analytical and transformation steps. First, the system analyzes the image to identify key components, such as textual data, pixel coordinates, and other visual elements. This involves techniques like OCR for extracting textual data and spatial analysis for determining the coordinates of specific pixels. Using this extracted information, the system generates the bifurcated reconstruction in two distinct forms. The first reconstructed form may be a structured representation that includes a textual reconstruction of the image. It captures the first text string derived from the textual data embedded in the image, along with its corresponding spatial information, such as the first pixel's coordinates. This format enables precise indexing and retrieval of textual content based on its spatial origin in the image. The second reconstructed form may be a visual recreation of the original image but modified to emphasize or annotate specific elements. For instance, it might generate a character-based, textual image reconstruction where the first textual data is represented as a character embedded at a position corresponding to the original pixel's location in the image. This dual reconstruction allows the system to provide both a textual interpretation and a visual representation, facilitating diverse applications such as data annotation, content validation, and multimodal analysis.

In some embodiments, the system may generate the bifurcated reconstruction by determining the first text string based on the first textual data, determining the first coordinate based on the first pixel, and populating a single line in the first reconstructed form with the first text string and the first coordinate. For example, the system generates the bifurcated reconstruction by systematically processing the textual and spatial data extracted from an image. First, the system determines the first text string by analyzing the image's textual data, using techniques such as OCR to identify and extract text content from specific regions of the image. Concurrently, the system identifies the first coordinate, which represents the spatial position of the corresponding text string within the image. This coordinate is derived from the location of the first pixel or a subset of pixels associated with the detected text, typically expressed as bounding box coordinates or pixel positions. After identifying the text string and its corresponding coordinate, the system populates a single line in the first reconstructed form with both elements. The text string and coordinate are structured together, often as a key-value pair or in a tabular format, ensuring that the relationship between the text and its spatial position is preserved. For example, the line might include the text "Invoice Number" along with its bounding box coordinates [x1, y1], [x2, y2], [x3, y3], and [x4, y4]. This step is repeated for all detected text elements in the image, resulting in a comprehensive first reconstructed form that organizes the text and its spatial metadata in a clear, line-by-line format. This structured representation enables efficient processing, analysis, and retrieval of both textual and spatial information from the image.

In some embodiments, the system may generate the bifurcated reconstruction by determining a three-dimensional matrix based on the first text string and determining the first reconstructed form based on the three-dimensional matrix. For example, the system generates the bifurcated reconstruction by constructing a three-dimensional matrix to represent the spatial and textual relationships within an image and subsequently determining the first reconstructed form based on this matrix. The process begins with the extraction of textual data, such as the first text string, and its associated spatial coordinates using techniques like OCR. For each detected text string, the system identifies its bounding box or pixel-level coordinates and aggregates these data points into a structured three-dimensional matrix. This matrix typically has a shape (Text Line, Bounding Boxes, x-y Coordinates), where each entry corresponds to a specific text string and its spatial location within the image.

The system then normalizes the data within the three-dimensional matrix, applying techniques like min-max scaling to ensure that the coordinates fit within a standardized range, such as 0 to 1, based on the desired output canvas size. This normalization ensures consistency across varying image resolutions and dimensions, preserving the relative spatial relationships between text elements. Using this processed matrix, the system constructs the first reconstructed form by mapping the text strings and their scaled spatial coordinates into a structured representation, such as a line-by-line format. Each line in the first reconstructed form includes a text string and its corresponding coordinate data, preserving the hierarchical and spatial relationships captured in the matrix. This representation provides a clear and organized view of the textual and spatial data, facilitating downstream tasks such as content analysis, visualization, or transformation into other forms like ASCII-based representations in the bifurcated reconstruction.

In some embodiments, the system generates the bifurcated reconstruction by determining an aggregated value based on the first text string based on the first textual data and the first coordinate, determining a matrix value based on the aggregated value by applying min-max scaling to the aggregated value, and determining the second reconstructed form based on the matrix value. For example, the system may generate the bifurcated reconstruction by systematically transforming the textual and spatial data into a structured format using aggregation, scaling, and mapping techniques. The process begins with the system extracting the first text string from the first textual data using an OCR model and associating it with the first coordinate, which represents the spatial position of the text within the image. The system then determines an aggregated value by combining the textual data (e.g., the text string) with its spatial metadata (e.g., bounding box coordinates). This aggregation ensures that the text and its positional context are captured in a unified representation. Next, the system calculates a matrix value by applying min-max scaling to the aggregated value. Min-max scaling normalizes the spatial coordinates to a standardized range, such as 0 to 1, ensuring consistency across images of varying dimensions. The scaling process involves using the formula: $X_{scaled} = (X - X_{min})/(X_{max} - X_{min})$, where X represents the aggregated value, $X_{min}$ and $X_{max}$ are the minimum and maximum values within the dataset, and $X_{scaled}$, is the normalized output. This step ensures that the spatial relationships of the text elements are preserved while adapting them to a fixed coordinate space. This step ensures that the spatial relationships of the text elements are preserved while adapting them to a fixed coordinate space. Finally, the system uses the scaled matrix value to generate the second reconstructed form, which is often an ASCII-based or visual representation of the image. In this reconstructed form, the normalized spatial coordinates guide the placement of ASCII characters or other visual markers corresponding to the text strings. This mapping ensures that the text and its spatial alignment are accurately represented in a simplified, text-based visualization. By combining the aggregated values, scaled matrix, and visual reconstruction, the system produces a bifurcated representation that captures both the textual content and its spatial structure in distinct, analyzable formats.

In some embodiments, the system may generate the bifurcated reconstruction by determining four boundary points in the first image that include the first pixel, determining the first coordinate based on the four boundary points, and determining the first reconstructed form based on the four boundary points. For example, the system generates the bifurcated reconstruction by identifying and utilizing four boundary points in the first image that define the spatial extent of a specific text region, including the first pixel. The process begins with the system analyzing the image to detect a text region containing the first pixel, typically using an OCR model to locate and extract text. The system identifies the four boundary points of the text region, which correspond to the coordinates of the bounding box: the bottom-left, bottom-right, top-right, and top-left corners. These points collectively define the spatial boundaries of the text region within the image. Using these four boundary points, the system determines the first coordinate, which represents the spatial position and dimensions of the text region. The first coordinate can include the coordinates of each boundary point or be represented in a format such as the bounding box dimensions and location within the image. This information ensures precise spatial mapping of the text region. The system then generates the first reconstructed form by organizing the textual data and spatial information extracted from the image. Each line in the reconstructed form includes the detected text string along with the corresponding four boundary points, ensuring a clear representation of both the textual content and its spatial positioning. This structured format facilitates tasks such as content analysis, layout reconstruction, or alignment with visual data in the image. By leveraging the four boundary points to define the spatial context, the system creates a robust and detailed representation of the text and its location, forming the foundation of the bifurcated reconstruction.

In some embodiments, the system may generate the bifurcated reconstruction by retrieving a character encoding format, determining that the first character of the character encoding format corresponds to the first pixel, and generating the second reconstructed form using the first character. For example, the system may generate the bifurcated reconstruction by leveraging a character encoding format to map textual representations to visual data. The process begins with the system retrieving a predefined character encoding format, such as ASCII, where characters are associated with specific numerical or visual representations. Using this encoding, the system determines that the first character in the encoding format corresponds to the first pixel in the image. This correspondence is based on the pixel's value or attributes, such as intensity, color, or position, which are mapped to the encoding format. For instance, a dark pixel might be mapped to a dense character like #, while a lighter pixel might correspond to a sparse character like a space ( ). Once the first character is identified, the system generates the second reconstructed form by translating the image's pixel data into a grid of characters based on the encoding format. Each character in the grid corresponds to a pixel or a group of pixels in the image, preserving the visual structure and spatial relationships. The first character is placed at the position associated with the first pixel, ensuring that the reconstruction aligns with the original image's layout. This character-based reconstruction simplifies the image into a text-based format, enabling efficient processing, visualization, or analysis in environments where text is more accessible than graphical data. By integrating character encoding with pixel-level mapping, the system creates a bifurcated reconstruction that bridges visual and textual representations of the image.

In some embodiments, the system may generate the bifurcated reconstruction by determining a first scale of the first image, determining a second scale of the character-based, textual image reconstruction, and determining the position based on comparing the first scale and the second scale. For example, the system generates the bifurcated reconstruction by analyzing and aligning scales between the original image and a reconstructed representation. The process begins with the system determining the first scale of the first image, which refers to the dimensions or resolution of the original image. This may include metrics such as pixel density, aspect ratio, or coordinate ranges that define the spatial boundaries of the content in the image. Concurrently, the system determines the second scale of the character-based, textual image reconstruction, which represents the reconstructed or transformed version of the first image, such as an ASCII representation or a scaled-down visualization. The second scale may involve normalized or altered dimensions that differ from the original image's scale but preserve its relative spatial relationships. The system then compares the first scale with the second scale to accurately align the spatial data. By analyzing the ratio or transformation required to map coordinates from the first scale to the second, the system determines the position of elements in the reconstructed image. For example, if the first scale uses pixel coordinates and the second scale employs normalized values between 0 and 1, the system applies a scaling factor to map positions consistently across both scales. This ensures that each element, such as a character or visual marker, occupies a position in the second reconstructed form that corresponds proportionally to its location in the original image. Using this scaled alignment, the system generates the second reconstructed form while maintaining the spatial integrity and relationships of the original content. This approach enables the bifurcated reconstruction to integrate both textual and visual representations, ensuring that the two forms are accurately correlated and usable for downstream analysis or visualization tasks.

In some embodiments, the system may generate the bifurcated reconstruction by determining a two-dimensional text canvas based on the first image and determining the character-based, textual image reconstruction based on the two-dimensional text canvas. For example, the system generates the bifurcated reconstruction by transforming the visual data from the first image into a simplified textual representation on a two-dimensional text canvas. The process begins with the system analyzing the first image to identify its spatial and content features, such as pixel intensity, layout, and any embedded text. Using this analysis, the system creates a two-dimensional text canvas that mirrors the structure and proportions of the original image. Each "cell" of this canvas corresponds to a specific region or pixel group in the image. The system populates the text canvas by mapping visual elements to text-based characters. For instance, darker regions of the image might be represented by denser ASCII characters like # or @, while lighter regions might use sparser characters like "." or spaces. This mapping ensures that the textual representation preserves the relative brightness, contrast, and structure of the original image. The canvas serves as a simplified yet meaningful abstraction of the image, allowing the visual information to be expressed entirely in text. Next, the system uses the two-dimensional text canvas to generate the character-based, textual image reconstruction, which visually represents the original image in the form of ASCII art or a similar text-based format. This character-based, textual image reconstruction maintains the spatial relationships and key visual patterns of the first image, enabling efficient processing, visualization, or analysis in text-dominant environments. By translating the first image into a two-dimensional text canvas and deriving the character-based, textual image reconstruction from it, the system ensures a cohesive and interpretable bifurcated reconstruction that integrates visual and textual data.

In some embodiments, the system may generate the bifurcated reconstruction by determining a first integer representation of the first character, determining a second integer representation of a second character for the character-based, textual image reconstruction, and determining that the first integer representation and the second integer representation do not overlap. For example, the system generates the bifurcated reconstruction by employing integer representations to uniquely identify and differentiate characters in the first and second forms. The process begins with the system analyzing the first image to determine a first integer representation for the first character. This integer representation is derived based on the encoding of the character, such as its ASCII value or a similar numerical mapping that uniquely identifies the character within the context of the first reconstructed form. Similarly, the system determines a second integer representation for a second character associated with the character-based, textual image reconstruction, often derived using the same or a compatible encoding scheme. This second integer corresponds to a text-based representation of the character-based, textual image reconstruction, such as an ASCII art form, where characters are mapped to regions of the image based on their visual or positional attributes. The system then compares the first and second integer representations to ensure they do not overlap. This step involves checking that the numerical values associated with the characters are distinct, ensuring that there is no ambiguity or redundancy in the mapping between the two reconstructed forms. By maintaining non-overlapping integer representations, the system ensures that the bifurcated reconstruction preserves the integrity and independence of the first and second forms. This separation allows the forms to coexist as distinct but complementary representations of the image, facilitating accurate processing and analysis across different modalities.

At step 506, process 500 (e.g., using one or more components described above) generates a model prompt. For example, the system may generate a first model prompt comprising the first reconstructed form, the second reconstructed form, and textual instructions for processing the first reconstructed form and the second reconstructed form. The system may generate a model prompt by synthesizing the necessary input data and instructions into a structured format that guides a model's processing tasks. To create the first model prompt, the system first compiles the outputs of the bifurcated reconstruction, including the first reconstructed form and the second reconstructed form. The first reconstructed form, which contains the extracted textual data (e.g., a first text string) and its associated spatial coordinates, is included as a discrete component of the prompt. Similarly, the second reconstructed form, which is a visually modified representation of the original image emphasizing key elements (e.g., a character-based, textual image reconstruction with the first character at a specific position), is added as a complementary input. In addition to these reconstructed forms, the system may generate clear and concise textual instructions detailing how the model should process the provided inputs. These instructions may specify tasks such as correlating textual data with visual elements, performing further transformations, or extracting insights from the combined inputs. By integrating these components—structured data, visual representations, and actionable instructions—the system ensures that the model prompt is comprehensive and aligns with the intended processing objectives. This structured approach facilitates effective model interpretation and enables the execution of complex, multi-modal tasks.

In some embodiments, the system may generate the first model prompt by determining a first set of instructions for inputting to the first model describing a first processing order for the first reconstructed form, determining a second set of instructions for inputting to the first model describing a second processing order for the first reconstructed form, and generating the textual instructions based on the first set of instructions and the second set of instructions. For example, the system generates the first model prompt by creating a structured set of instructions that guide the processing of the first reconstructed form in a logical and coherent manner. The process begins with the system determining a first set of instructions that describe a specific processing order for the first reconstructed form. These instructions outline the initial tasks the model should perform, such as extracting specific elements, analyzing textual data, or organizing information based on spatial or semantic criteria. Simultaneously, the system determines a second set of instructions that describe an alternative or subsequent processing order for the first reconstructed form. This second set may involve complementary tasks such as cross-referencing extracted data, applying transformations, or validating outputs against predefined criteria. The second set of instructions is designed to build upon or refine the results of the first set, ensuring a comprehensive and multi-step approach to processing the reconstructed form. Using these two sets of instructions, the system generates textual instructions that synthesize the first and second processing orders into a cohesive directive for the model. This synthesis involves organizing the instructions into a logical sequence, specifying dependencies between tasks, and ensuring clarity and precision in the guidance provided. The resulting model prompt integrates both the first and second sets of instructions, providing the model with a clear roadmap for handling the first reconstructed form. This structured prompt enables the model to execute complex processing workflows efficiently, ensuring accurate and meaningful results.

In some embodiments, the system may generate the first model prompt by receiving an output format for an output generated based on the first model prompt and including the output format in the first model prompt. For example, the system may generate the first model prompt by incorporating an expected output format into the structured instructions provided to the model. The process begins with the system receiving an output format that specifies the structure, style, or type of the output to be generated based on the first model prompt. This output format may be defined by a user, application requirements, or pre-established templates and can include details such as whether the output should be an extraction, a list, a table, or another specific representation. Once the output format is received, the system integrates it into the first model prompt as a key component of the instructions. The inclusion of the output format provides the model with explicit guidance on how the results should be organized and presented, ensuring alignment with the intended use case. For instance, if the output format specifies a tabular representation, the prompt will direct the model to organize data into rows and columns. If the format requires a narrative extraction, the prompt will instruct the model to synthesize the data into a cohesive textual overview. By embedding the output format within the first model prompt, the system ensures that the model generates results that meet the desired specifications. This integration of output expectations into the prompt enhances the model's ability to produce accurate and contextually relevant outputs tailored to the needs of the task or user.

At step 508, process 500 (e.g., using one or more components described above) generates a extraction of the image. For example, the system may generate, based on inputting the first model prompt into a first model, a first extraction of the first image based on the first model prompt. To generate an extraction of an image, the system may process the image and its related data through a model trained for summarization tasks. Initially, the system inputs the first model prompt into the first model. This prompt includes the bifurcated reconstruction of the image—comprising the first reconstructed form (textual data and spatial coordinates) and the second reconstructed form (a visual representation with key elements highlighted)—along with textual instructions guiding the model's analysis. The model may process these inputs, integrating the extracted textual and visual information to generate a coherent and concise extraction of the image. It analyzes the first reconstructed form to identify meaningful textual elements and their context, using spatial coordinates to enhance interpretability. Simultaneously, it examines the second reconstructed form to understand visual features and their alignment with the textual data. Based on these inputs, the model synthesizes a high-level extraction that captures the essential content and structure of the image, such as identifying its primary themes, key elements, and any notable relationships between textual and visual components. This extraction may provide a textual representation of the image's core information, enabling users to quickly grasp its content without detailed analysis. By leveraging the structured data and guidance provided in the model prompt, the system ensures that the generated extraction is both accurate and contextually relevant.

In some embodiments, the system generates the first extraction of the first image based on the first model prompt by inputting the first model prompt into an LLM to determine a first output and determining the first extraction based on the first output. For example, the system generates the first extraction of the first image by leveraging the structured guidance provided in the first model prompt and the processing capabilities of an LLM. The process begins with the system inputting the first model prompt into the LLM. The prompt includes detailed instructions, the first reconstructed form of the image, and any additional contextual or procedural information necessary for the task. This ensures that the LLM has a clear understanding of the data and the required processing steps. The LLM processes the input prompt to produce a first output, which may include extracted insights, reorganized textual data, or interpretations based on the reconstructed form. This output reflects the LLM's ability to synthesize information from the prompt, analyze the content of the first image, and identify key details or patterns within the data. Using the first output, the system determines the first extraction, distilling the LLM's response into a concise and coherent textual representation of the image's core information. This extraction captures the essential content, such as the main textual elements, their spatial relationships, or the overarching theme of the image. By combining the structured input of the model prompt with the LLM's processing capabilities, the system ensures that the generated extraction is accurate, relevant, and contextually meaningful. This approach enables efficient interpretation and utilization of complex visual data in a textual format.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method as well as an iterative and/or self-reflective manner. Furthermore, it should be noted that any of the components, devices, or equipment discussed in relation to the figures above could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for analyzing images to generate textual extractions.

2. The method of the preceding embodiment, further comprising: receiving a first image, wherein the first image comprises first textual data at a first pixel in the first image; processing the first image to generate a bifurcated reconstruction of the first image, wherein the bifurcated reconstruction comprises a first reconstructed form comprising a first text string based on the first textual data and a first coordinate based on the first pixel, wherein the bifurcated reconstruction comprises a second reconstructed form comprising a character-based, textual image reconstruction based on the first image, wherein the character-based, textual image reconstruction comprises a first character based on the first textual data at a position in the character-based, textual image reconstruction based on the first pixel; generating a first model prompt comprising the first reconstructed form, the second reconstructed form, and textual instructions for processing the first reconstructed form and the second reconstructed form; and generating, based on inputting the first model prompt into a first model, a first extraction of the first image based on the first model prompt.

3. The method of any one of the preceding embodiments, wherein generating the bifurcated reconstruction further comprises: determining the first text string based on the first textual data; determining the first coordinate based on the first pixel; and populating a single line in the first reconstructed form with the first text string and the first coordinate.

4. The method of any one of the preceding embodiments, wherein generating the bifurcated reconstruction further comprises: determining a three-dimensional matrix based on the first text string; and determining the first reconstructed form based on the three-dimensional matrix.

5. The method of any one of the preceding embodiments, wherein generating the bifurcated reconstruction further comprises: determining an aggregated value based on the first text string based on the first textual data and the first coordinate; determining a matrix value based on the aggregated value by applying min-max scaling to the aggregated value; and determining the second reconstructed form based on the matrix value.

6. The method of any one of the preceding embodiments, wherein generating the bifurcated reconstruction further comprises: determining four boundary points in the first image that include the first pixel; determining the first coordinate based on the four boundary points; and determining the first reconstructed form based on the four boundary points.

7. The method of any one of the preceding embodiments, wherein generating the bifurcated reconstruction further comprises: retrieving a character encoding format; determining that the first character of the character encoding format corresponds to the first pixel; and generating the second reconstructed form using the first character.

8. The method of any one of the preceding embodiments, wherein generating the bifurcated reconstruction further comprises: determining a first scale of the first image; determining a second scale of the character-based, textual image reconstruction; and determining the position based on comparing the first scale and the second scale.

9. The method of any one of the preceding embodiments, wherein generating the bifurcated reconstruction further comprises: determining a two-dimensional text canvas based on the first image; and determining the character-based, textual image reconstruction based on the two-dimensional text canvas.

10. The method of any one of the preceding embodiments, wherein generating the bifurcated reconstruction further comprises: determining a first integer representation of the first character; determining a second integer representation of a second character for the character-based, textual image reconstruction; and determining that the first integer representation and the second integer representation do not overlap.

11. The method of any one of the preceding embodiments, wherein generating the first model prompt further comprises: determining a first set of instructions for inputting to the first model describing a first processing order for the first reconstructed form; determining a second set of instructions for inputting to the first model describing a second processing order for the first reconstructed form; and generating the textual instructions based on the first set of instructions and the second set of instructions.

12. The method of any one of the preceding embodiments, wherein generating the first extraction of the first image based on the first model prompt further comprising: inputting the first model prompt into a large language model to determine a first output; and determining the first extraction based on the first output.

13. The method of any one of the preceding embodiments, wherein generating the first model prompt further comprises: receiving an output format for an output generated based on the first model prompt; and including the output format in the first model prompt.

14. The method of any one of the preceding embodiments, wherein processing the first image to generate the bifurcated reconstruction further comprises: inputting the first image into an object character recognition model to receive a first output; and generating the bifurcated reconstruction based on the first output.

15. The method of any one of the preceding embodiments, wherein processing the first image to generate the bifurcated reconstruction further comprises: receiving a machine-readable text format of the first textual data generating by an object character recognition model; and applying an object character recognition restructuring protocol model to the machine-readable text format of the first textual data.

16. One or more non-transitory, computer-readable mediums storing instructions that, when executed by a data processing apparatus, cause the data processing apparatus to perform operations comprising those of any of embodiments 1-15.

17. A system comprising one or more processors; and memory storing instructions that, when executed by the processors, cause the processors to effectuate operations comprising those of any of embodiments 1-15.

18. A system comprising means for performing any of embodiments 1-15.

What is claimed is:

1. A system for analyzing images to generate textual extractions using bifurcated image reconstructions, the system comprising:
one or more processors; and
one or more non-transitory, computer-readable mediums comprising instructions that when executed by the one or more processors cause operations comprising:
receiving an image of a document for processing, wherein the image comprises textual data corresponding to a plurality of pixels in the image;
processing, using an object character recognition model, the image to generate a bifurcated reconstruction of the image based on detected patterns, wherein the bifurcated reconstruction comprises:
a first reconstructed form comprising a plurality of text strings, wherein each of the plurality of text strings occupies a single line of the first reconstructed form, wherein each of the plurality of text strings corresponds to a respective portion of the textual data as detected in the image by the object character recognition model and a respective coordinate in the image of a respective subset of pixels of the plurality of pixels corresponding to the respective portion;
a second reconstructed form comprising an ASCII image reconstruction based on the image, wherein the ASCII image reconstruction comprises a first ASCII character based on the textual data at a position in the image based on the respective subset of pixels;
generating a model prompt comprising the first reconstructed form, the second reconstructed form, and textual instructions for processing the first reconstructed form and the second reconstructed form; and
generating, based on inputting the model prompt into a model, an extraction of the image based on the model prompt.

2. A method for analyzing images to generate textual extractions, the method comprising:
receiving a first image, wherein the first image comprises first textual data at a first pixel in the first image;
processing the first image to generate a bifurcated reconstruction of the first image, wherein the bifurcated reconstruction comprises a first reconstructed form comprising a first text string based on the first textual data and a first coordinate based on the first pixel, wherein the bifurcated reconstruction comprises a second reconstructed form comprising a character-based, textual image reconstruction based on the first image, wherein the character-based, textual image reconstruction comprises a first character based on the first textual data at a position in the character-based, textual image reconstruction based on the first pixel;
generating a first model prompt comprising the first reconstructed form, the second reconstructed form, and textual instructions for processing the first reconstructed form and the second reconstructed form; and
generating, based on inputting the first model prompt into a first model, a first extraction of the first image based on the first model prompt.

3. The method of claim 2, wherein generating the bifurcated reconstruction further comprises:
determining the first text string based on the first textual data;
determining the first coordinate based on the first pixel; and
populating a single line in the first reconstructed form with the first text string and the first coordinate.

4. The method of claim 2, wherein generating the bifurcated reconstruction further comprises:

determining a three-dimensional matrix based on the first text string; and determining the first reconstructed form based on the three-dimensional matrix.

5. The method of claim 2, wherein generating the bifurcated reconstruction further comprises:

determining an aggregated value based on the first text string based on the first textual data and the first coordinate;

determining a matrix value based on the aggregated value by applying min-max scaling to the aggregated value; and determining the second reconstructed form based on the matrix value.

6. The method of claim 2, wherein generating the bifurcated reconstruction further comprises:

determining four boundary points in the first image that include the first pixel;

determining the first coordinate based on the four boundary points; and determining the first reconstructed form based on the four boundary points.

7. The method of claim 2, wherein generating the bifurcated reconstruction further comprises:

retrieving a character encoding format;

determining that the first character of the character encoding format corresponds to the first pixel; and generating the second reconstructed form using the first character.

8. The method of claim 2, wherein generating the bifurcated reconstruction further comprises:

determining a first scale of the first image;

determining a second scale of the character-based, textual image reconstruction; and determining the position based on comparing the first scale and the second scale.

9. The method of claim 2, wherein generating the bifurcated reconstruction further comprises:

determining a two-dimensional text canvas based on the first image; and determining the character-based, textual image reconstruction based on the two-dimensional text canvas.

10. The method of claim 2, wherein generating the bifurcated reconstruction further comprises:

determining a first integer representation of the first character;

determining a second integer representation of a second character for the character-based, textual image reconstruction; and determining that the first integer representation and the second integer representation do not overlap.

11. The method of claim 2, wherein generating the first model prompt further comprises:

determining a first set of instructions for inputting to the first model describing a first processing order for the first reconstructed form;

determining a second set of instructions for inputting to the first model describing a second processing order for the first reconstructed form; and generating the textual instructions based on the first set of instructions and the second set of instructions.

12. The method of claim 2, wherein generating the first extraction of the first image based on the first model prompt further comprising:

inputting the first model prompt into a large language model to determine a first output; and determining the first extraction based on the first output.

13. The method of claim 2, wherein generating the first model prompt further comprises:

receiving an output format for an output generated based on the first model prompt; and including the output format in the first model prompt.

14. The method of claim 2, wherein processing the first image to generate the bifurcated reconstruction further comprises:

inputting the first image into an object character recognition model to receive a first output; and generating the bifurcated reconstruction based on the first output.

15. The method of claim 2, wherein processing the first image to generate the bifurcated reconstruction further comprises:

receiving a machine-readable text format of the first textual data generating by an object character recognition model; and applying an object character recognition restructuring protocol model to the machine-readable text format of the first textual data.

16. One or more non-transitory, computer-readable mediums, comprising instructions that, when executed by one or more processors, cause operations comprising:

receiving a first image, wherein the first image comprises first textual data;

processing the first image to generate a bifurcated reconstruction of the first image, wherein the bifurcated reconstruction comprises a first reconstructed form comprising a first text string based on the first textual data and a first coordinate, wherein the bifurcated reconstruction comprises a second reconstructed form comprising a character-based, textual image reconstruction based on the first image, wherein the character-based, textual image reconstruction comprises a first character based on the first textual data at a position in the character-based, textual image reconstruction;

generating a first model prompt comprising the first reconstructed form, the second reconstructed form, and textual instructions for processing the first reconstructed form and the second reconstructed form; and generating, based on inputting the first model prompt into a first model, a first extraction of the first image based on the first model prompt.

17. The one or more non-transitory, computer-readable mediums of claim 16, wherein generating the first model prompt further comprises:

determining a first set of instructions for inputting to the first model describing a first processing order for the first reconstructed form;

determining a second set of instructions for inputting to the first model describing a second processing order for the first reconstructed form; and generating the textual instructions based on the first set of instructions and the second set of instructions.

18. The one or more non-transitory, computer-readable mediums of claim 16, wherein generating the first extraction of the first image based on the first model prompt further comprising:

inputting the first model prompt into a large language model to determine a first output; and determining the first extraction based on the first output.

19. The one or more non-transitory, computer-readable mediums of claim 16, wherein generating the first model prompt further comprises:

receiving an output format for an output generated based on the first model prompt; and including the output format in the first model prompt.

20. The one or more non-transitory, computer-readable mediums of claim 16, wherein processing the first image to generate the bifurcated reconstruction further comprises:

inputting the first image into an object character recognition model to receive a first output; and generating the bifurcated reconstruction based on the first output.

* * * * *